(12) United States Patent
Liu et al.

(10) Patent No.: US 12,309,438 B2
(45) Date of Patent: May 20, 2025

(54) SYSTEMS AND METHODS FOR PROVIDING INTERACTIVE ADULT ENTERTAINMENT IN A LIVE BROADCAST ROOM

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/605,674

(22) Filed: Mar. 14, 2024

(65) Prior Publication Data
US 2025/0142136 A1    May 1, 2025

Related U.S. Application Data

(63) Continuation of application No. 18/494,101, filed on Oct. 25, 2023.

(51) Int. Cl.
| | | |
|---|---|---|
| *H04N 21/2187* | (2011.01) |
| *A61H 19/00* | (2006.01) |
| *H04N 21/431* | (2011.01) |
| *H04N 21/4725* | (2011.01) |

(52) U.S. Cl.
CPC ......... *H04N 21/2187* (2013.01); *A61H 19/00* (2013.01); *H04N 21/4312* (2013.01); *H04N 21/4725* (2013.01); *A61H 2201/5097* (2013.01)

(58) Field of Classification Search
CPC ............. H04N 21/4223; H04N 21/472; H04N 21/4854; H04N 23/555; H04N 23/61; H04N 23/661; H04N 23/695; H04N 23/698; H04N 5/268; H04N 7/141; H04N 7/147; H04N 21/2187; H04N 21/4312; H04N 21/4725; A61H 19/00; A61H 2201/5012; A61H 2201/5097
See application file for complete search history.

(56) References Cited

U.S. PATENT DOCUMENTS 11,134,041 B1 * 9/2021 He .................. G06Q 20/065
2022/0266155 A1   8/2022 Kaszaly

OTHER PUBLICATIONS

The Internet's impact on sexuality: A critical review of 15 years of research, Nicola M. Döring, 2019, pp. 1-5, Germany.

* cited by examiner

*Primary Examiner* — Omar S Parra
(74) *Attorney, Agent, or Firm* — Evergreen Valley Law Group; Kanika Radhakrishnan

(57) ABSTRACT

The present invention relates to methods and systems for providing interactive adult entertainment in a live broadcast room. The method performed by an application server includes activating an interactive mode in a live broadcast room of a model user. The method includes receiving an input data in the live broadcast room from at least one viewer, and computing whether the input data provided by at least one viewer of the plurality of viewers triggers the interactive mode under a probability metric. Further, the method includes generating a control instruction in response to triggering the interactive mode, for operating a sexual stimulation device of the model user. The method further includes transmitting the control instruction to a user device of the model user. The control instruction operates the sexual stimulation device to perform a first action for providing sexual stimulation to the model user.

19 Claims, 10 Drawing Sheets

SYSTEMS AND METHODS FOR PROVIDING INTERACTIVE ADULT ENTERTAINMENT IN A LIVE BROADCAST ROOM

TECHNICAL FIELD

The present disclosure relates to electronic-based adult entertainment and more particularly relates to systems and methods for providing interactive adult entertainment to viewers of a live broadcast room based on user input data of the viewers in the live broadcast room.

BACKGROUND

Nowadays, the prevalence of online adult entertainment has increased, offering sexually stimulating content to viewers. This involves users engaging with adult toys to provide live broadcasts, arousing one or more viewers through sexual stimulation.

Typically, users determine a preset amount for viewers to connect during the live broadcast. This amount is influenced by various factors, such as the timing of the broadcast, the type of adult toy used (e.g., dildo, vibrator, etc.), and the operating parameters of the adult toy (e.g., vibration intensity, thrusting effect, etc.). However, a challenge arises during the live broadcast as viewers may not always experience the desired sexual pleasure due to variations in these factors set by the user. To address this limitation, adult toys are being developed with remote control capabilities, allowing viewers to adjust these factors during the live broadcast and attain the desired sexual pleasure.

Nevertheless, the current method of controlling the adult toy during the live broadcast is primarily reliant on the preset amount determined by the user, leading to relatively simple interactions. Consequently, users may fail to provide intense sexual pleasure to viewers as per their individual preferences, potentially leading to a decline in viewer willingness to pay more for the live broadcast.

Therefore, there exists a need to develop an improved system and method for providing interactive adult entertainment that overcomes the aforementioned deficiencies along with providing other advantages.

SUMMARY

Various embodiments of the present disclosure disclose methods and systems for providing interactive adult entertainment in a live broadcast room.

In an embodiment, a computer-implemented method is disclosed. The computer-implemented method performed by an application server includes activating an interactive mode among one or more operating modes in a live broadcast room of a model user. The live broadcast room is created by the model user and streamed to a plurality of viewers via a live streaming interactive platform. The method includes receiving an input data provided in the live broadcast room by at least one viewer of the plurality of viewers while the interactive mode is activated. Further, the method includes computing whether the input data provided by at least one viewer of the plurality of viewers triggers the interactive mode under a probability metric. The probability metric is indicative of the probability of triggering the interactive mode. The method includes generating a control instruction in response to triggering the interactive mode, for operating a sexual stimulation device of the model user. The control instruction includes one or more parameters for operating the sexual stimulation device. The method further includes transmitting the control instruction to a user device associated with the model user. The sexual stimulation device is communicably coupled to the user device of the model user. The control instruction operates the sexual stimulation device of the model user to perform a first action based on the one or more parameters appended in the control instruction for providing sexual stimulation to the model user.

In another embodiment, an application server is disclosed. The application server includes a communication interface, a memory configured to store instructions and a processor. The processor is configured to execute the instructions stored in the memory and thereby cause the application server to at least activate an interactive mode among one or more operating modes in a live broadcast room of a model user. The live broadcast room is created by the model user and streamed to a plurality of viewers via a live streaming interactive platform. The application server is caused to receive an input data provided in the live broadcast room by at least one viewer of the plurality of viewers while the interactive mode is activated. Further, the application server is caused to compute whether the input data provided by at least one viewer of the plurality of viewers triggers the interactive mode under a probability metric. The probability metricis indicative of the probability of triggering the interactive mode. The application server is caused to generate a control instruction in response to triggering the interactive mode, for operating a sexual stimulation device of the model user. The control instruction includes one or more parameters for operating the sexual stimulation device. The application server is further caused to transmit the control instruction to a user device associated with the model user. The sexual stimulation device is communicably coupled to the user device of the model user. The control instruction operates the sexual stimulation device of the model user to perform a first action based on the one or more parameters appended in the control instruction for providing sexual stimulation to the model user.

In another embodiment, A non-transitory computer-readable storage medium is disclosed. The non-transitory computer-readable storage medium includes computer-executable instructions that, when executed by at least a processor of an application server, cause the application server to perform a method including activating an interactive mode among one or more operating modes in a live broadcast room of a model user, the live broadcast room being created by the model. The method includes receiving an input data provided in the live broadcast room by at least one viewer of the plurality of viewers while the interactive mode is activated. Further, the method includes computing whether the input data provided by at least one viewer of the plurality of viewers triggers the interactive mode under a probability metric. The probability metricis indicative of the probability of triggering the interactive mode. The method includes generating a control instruction in response to triggering the interactive mode, for operating a sexual stimulation device of the model user. The control instruction including one or more parameters for operating the sexual stimulation device. The method further includes transmitting the control instruction to a user device associated with the model user. The sexual stimulation device is communicably coupled to the user device of the model user. The control instruction operates the sexual stimulation device of the model user to perform a first action based on the one or more parameters appended in the control instruction for providing sexual stimulation to the model user.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features.

The phrases "triggering the interactive mode under a probability metric" and "probability of triggering the interactive mode" are used interchangeably throughout the present disclosure. It is to be understood that the phrases "triggering the interactive mode under a probability metric" and "probability of triggering the interactive mode" indicate the value of the input data provided by viewers of a live broadcast room.

Various embodiments of the present invention are described hereinafter with reference to FIG. 1 to FIG. 8.

Figure 1:
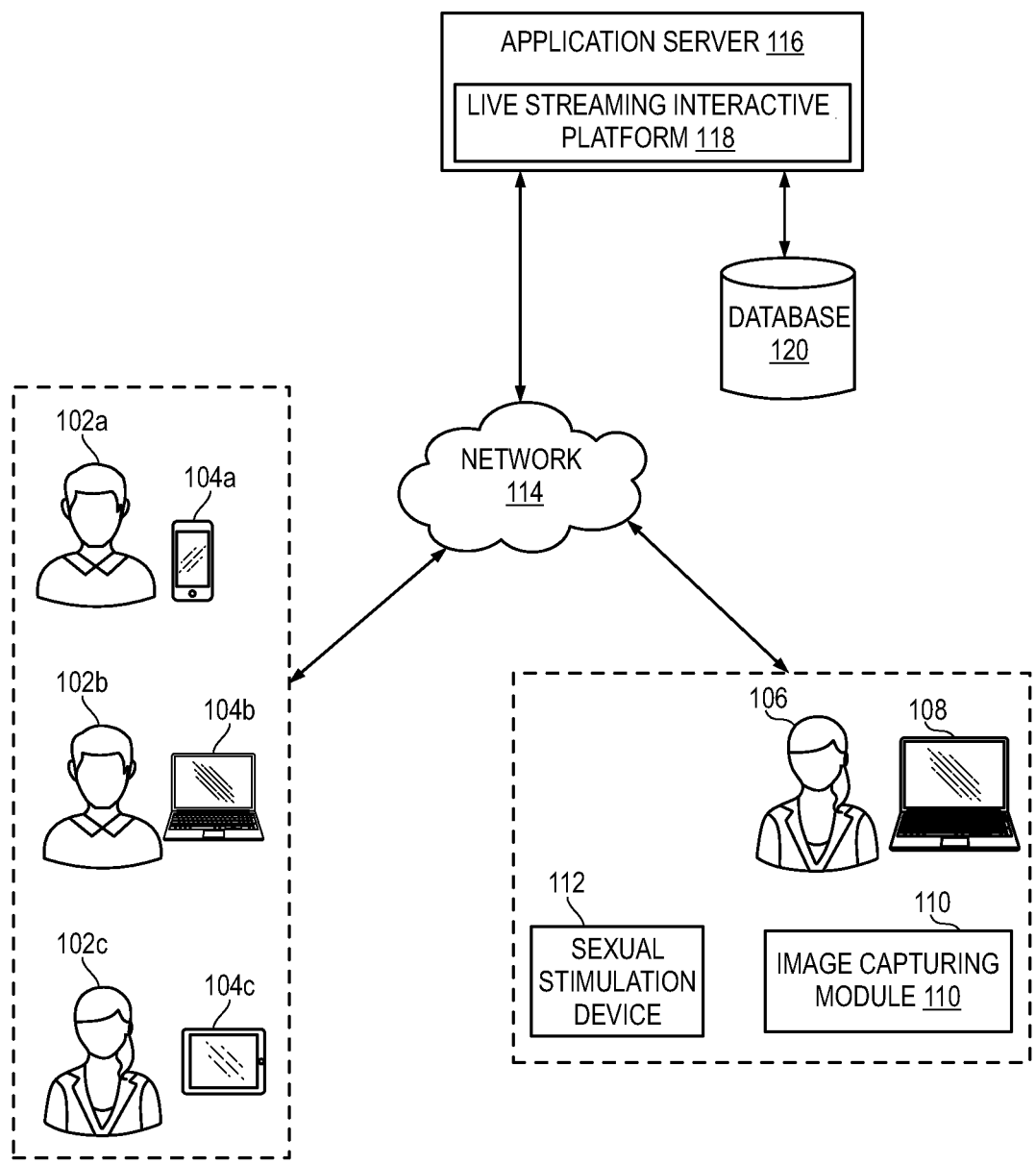
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of viewers (collectively referred for a viewer 102a, a viewer 102b and a viewer 102c). Each of the viewers 102a, 102b, and 102c is associated with a user device 104a, a user device 104b, and a user device 104c. The user devices 104a-104c may include at least a laptop computer, a phablet computer, a handheld personal computer, a virtual reality (VR) device, netbook, Web book, tablet computing device, Smartphone, or other mobile computing devices. Further, the environment 100 includes a model user 106. In an embodiment, the model user 106 may be a user performing sexual content. Furthermore, the model user 106 is associated with a user device 108 (exemplarily depicted to be 'a laptop computer') and an image capturing module 110. The image capturing module 110 may be connected to the user device 108 using wired/wirelessly communication. Some examples of the wireless communication may include Bluetooth, near field communication (NFC), Wireless-Fidelity (Wi-Fi), and the like. In one scenario, the model user 106 captures the sexual content using the image capturing module 110. In another scenario, the model user 106 may utilize the image capturing module of the user device 108 for capturing the sexual content being performed by the model user 106. In addition, the model user 106 may live stream the captured sexual content to the viewers 102a-102c through an online live streaming platform which will be explained further in detail.

Further, the model user 106 is associated with a sexual stimulation device 112. It is to be noted that the sexual stimulation device 112 are selected based on the gender of the model user 106. For illustration purposes, the model user 106 is depicted as a female user performing the sexual act and live streamed to the viewers 102a-102c. Thus, the sexual stimulation device 112 associated with the model user 106 is a female sex toy. Some examples of the female sex toys may include, but are not limited to, a dildo, a vibrator, and the like. In an embodiment, the model user 106 may be a male user having a male sex toy (for e.g., masturbator). The sexual stimulation device 112 may be connected to the user device 108 using short-range wireless communication protocols. Some examples of the short-range wireless communication protocols may be, but are not limited to, near field communication (NFC), wireless fidelity (Wi-Fi), Bluetooth, and the like.

Various entities in the environment 100 may connect to a network 114 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 114 may include a secure protocol (e.g., Hypertext Transfer Protocol (HTTP)), and/or any other protocol, or set of protocols. In an example embodiment, the network 114 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes an application server 116. The application server 116 is configured to host and manage a live streaming interactive platform 118. The application server 116 may be embodied in at least one computing device in communication with the network 114. The application server 116 may be specifically configured, via executable instructions to perform one or more of the operations described herein. In general, the application server 116 may be configured to at least live stream the sexual content of the model user 106 to the viewers 102a-102c through the live streaming interactive platform 118 for providing interactive adult entertainment which will be explained further in detail. The live streaming interactive platform 118 is a set of computer-executable codes configured to allow the model user 106 to create a live broadcast room for the viewers 102a-102c. In one embodiment, the live streaming interactive platform 118 may be accessed as a web based application on the user devices 102a-102c and the user device 108. In another embodiment, the user devices 104a-104c and the user device 108 may access an instance of the live streaming interactive platform 118 from the application server 116 for installing on the user devices 104a-104c and the user device 108 using application stores associated with operating systems such as Apple iOS®, Android™ OS, Google Chrome OS, Symbian OS®, Windows Mobile® OS, and the like.

The model user 106 and the viewers 102a-102c may be required to undergo a one-time registration process for utilizing the services of the live streaming interactive platform 116. The application server 116 may render a user interface (UI) on their respective user devices 102a-102c and 108 for allowing the viewers 102a-102c and the model user 106 to complete the one-time registration process to the live streaming interactive platform 116. The model user 106 and the viewers 102a-102c may provide details such as name, age, gender, contact details, and the like in the user interface for completing the registration process. Upon successful registration, the application server 116 allows the model user 106 and the viewers 102a-102c to access the live streaming interactive platform 120.

In an embodiment, the application server 116 renders the sexual content of the model user 106 to the live broadcast room in real-time, thereby allowing the viewers 102a-102c to view the content on their respective user devices 104a-104c. Further, the viewers 102a-102c may provide an input data in the live broadcast room while the model user 106 is online, for controlling the operations of the sexual stimulation device 112 of the model user 106 in real-time. The operation of the sexual stimulation device 112 is based on the selection of an operating mode among one or more operating modes rendered in the live streaming interactive platform 118. The operating modes rendered in the live streaming interactive platform 118 may include an interactive mode, a basic mode, and the like.

In one scenario, the application server 116 may activate the interactive mode among the one or more operating modes in the live broadcast room. In one scenario, the model user 106 may provide a selection input in the live broadcast room for selecting the interactive mode in the live broadcast room. To that effect, the application server 116 activates the interactive mode in the live broadcast room. Thereafter, the viewers (e.g., the viewers 102a-102c) joining the live broadcast room are allowed to provide an input data in the interactive mode. The input data may include one or more tokens provided by the viewers 102a-102c in the live broadcast room. The tokens provided in the live streaming interactive platform 118 may contain or hold monetary value in the live streaming interactive platform 118. The viewers 102a-120c may provide the input data (i.e., the tokens) to the model user 106 in the live broadcast room for controlling activities (e.g., the sexual stimulation device 112) of the model user 106 which will be explained further in detail.

Further, the applications server 116 may compute whether the input data provided by at least one viewer (e.g., the viewer 102a) of the plurality of viewers triggers the interactive mode under a probability metric. As explained above, the tokens hold the monetary value in the live streaming interactive platform 118. It is to be understood that the value of the input data corresponds to the value of the tokens. The interactive mode can be triggered each time when the viewer 102a provides the input data (tokens) in the live broadcast room in the interactive mode. The interactive mode is triggered in the live broadcast room corresponding to the probability metric. To that effect, the application server 116 computes the probability of triggering the interactive mode in the live broadcast room based on the input data.

Thereafter, the application server 116 generates a control instruction in response to triggering the interactive mode, for operating the sexual stimulation device 112 of the model user 106. The control instruction is appended with one or more parameters for operating the sexual stimulation device 112. The one or more parameters may include, but are not limited to, duration and operating intensity of the sexual stimulation device 112. As shown, the model user 106 is a female user. Hence, the sexual stimulation device 112 is a female sex toy (e.g., a vibrator). In this scenario, the control instruction is appended with the duration of operating the vibrator and the operating intensity (i.e., intensity of the vibrotactile output) of the vibrator. It is to be understood that the parameters (i.e., duration and operating intensity) in the control instruction are based on the preset rule. In the interactive mode, the control instruction operates the sexual stimulation device 112 to perform a first action. The first action is based on the duration and the operating intensity of the control instruction. Further, the sexual stimulation device 112 performing the first action provides sexual stimulation to the model user 106.

In another scenario, the live broadcast room may be activated with a basic mode among the one or more operating modes rendered in the live streaming interactive platform 118. It is to be noted that the basic mode is activated in the live broadcast room of the model user 106 while the interactive mode is deactivated. In an embodiment, the basic mode may be a default mode in the live broadcast room. To that effect, the basic mode is activated by default in the live broadcast room when the interactive mode is deactivated. In this scenario, the viewer 102a may provide the input data (i.e., the tokens) to the model user 106. The application server 116 determines the value of the input data (i.e., the tokens) is within the specified range that is defined in the basic mode. Thereafter, the application server 116 generates a control instruction corresponding to the specified range in the basic mode. That is, the parameters (i.e., the operating intensity and the duration) are preset for the specified range in the basic mode. The control instruction generated corresponding to the specified range is transmitted to the sexual stimulation device 112, thereby operating the sexual stimulation device 112 to perform a second action. The sexual stimulation device 112 performing the second action provides sexual stimulation to the model user 106 in the live broadcast room.

In addition, the application server 116 is configured to render multiple activities, effects, and interactive components in the live broadcast room. The viewers 102a-102c are allowed to interact or utilize the above services of the live streaming interactive platform 118 which will be explained further in detail. Thus, it is understood that the application server 116 is configured to provide interactive adult entertainment in the live broadcast room.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2:
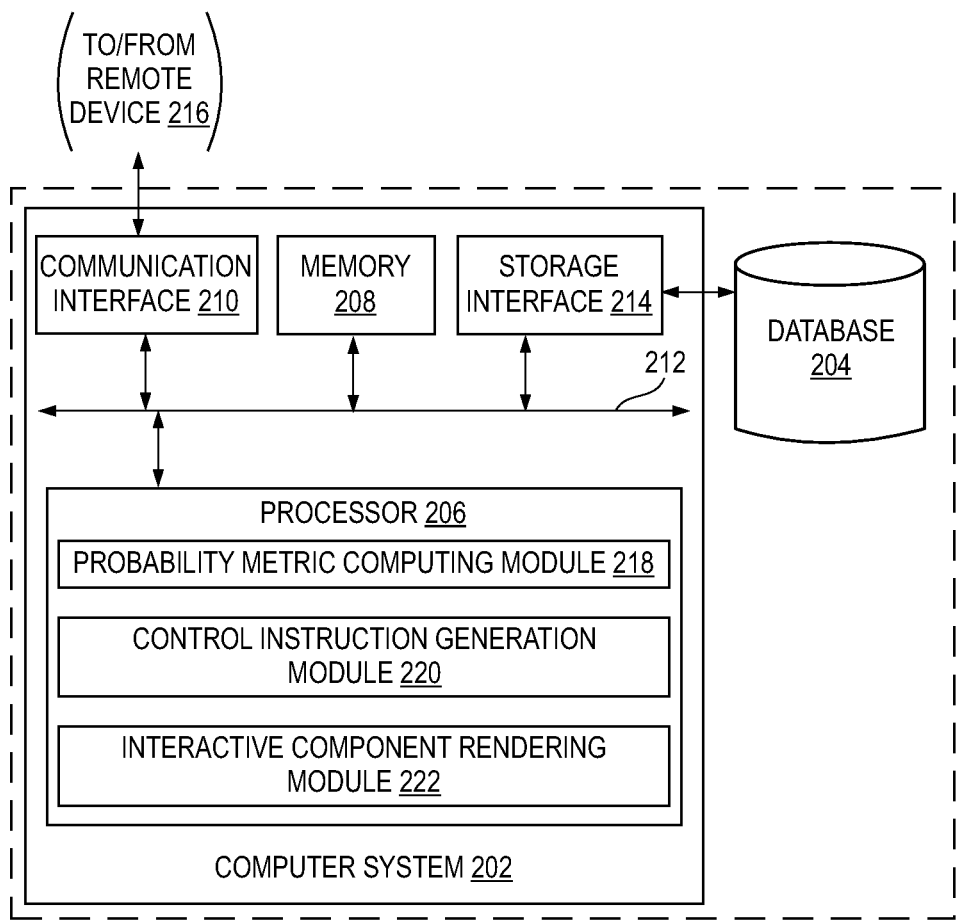
FIG. 2 illustrates a simplified block diagram of an application server for providing interactive adult entertainment in a live broadcast room, in accordance with an embodiment of the present disclosure.

FIG. 2 illustrates a simplified block diagram of an application server 200 used for providing interactive adult entertainment in the live broadcast room, in accordance with an embodiment of the present disclosure. The application server 200 may be an example of the application server 116 of FIG. 1. The application server 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the live streaming interactive platform 118 and one or more components of the live streaming interactive platform 118. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the application server 200, as described herein. In some embodiments, the memory 208 may be realized in the form of a database server or cloud storage working in conjunction with the application server 200, without deviating from the scope of the present disclosure.

The processor 206 is operatively coupled to the communication interface 210 such that the processor 206 is capable of communicating with a remote device 216 such as the user devices 104a-104c and the user device 108, or with any entity connected to the network 114 as shown in FIG. 1.

It is noted that the application server 200 as illustrated and hereinafter described is merely illustrative of an apparatus that could benefit from embodiments of the present disclosure and, therefore, should not be taken to limit the scope of the present disclosure. It is noted that the application server 200 may include fewer or more components than those depicted in FIG. 2.

In one embodiment, the processor 206 includes a probability metric computing module 218, a control instruction generation module 220, and an interactive component rendering module 222. As such, the one or more components of the processor 206 as described above are communicably coupled with the live streaming interactive platform 118.

The probability metric computing module 218 includes suitable logic and/or interfaces for the probability metric corresponding to the value of the input data. As explained above, the probability metric is computed corresponding to the value of the input data in the interactive mode. In particular, the application server 200 receives the input data (i.e., the tokens) provided by the viewer 102a in real-time. Upon receipt of the input data, the probability metric computing module 218 computes whether the input data provided by at least one viewer of the plurality of viewers triggers the interactive mode under a probability metric. Further, the probability metric is indicative of the probability of triggering the interactive mode. Further, the probability metric computing module 218 computes the probability of triggering the interactive mode corresponding to the value of the tokens (i.e., the input data). For example, the viewer 102a may provide 15 tokens in the live broadcast room of the model user 106. In this scenario, the probability metric computing module 218 computes the probability of triggering the interactive mode as 2 percent of a maximum aggregated score of the interactive mode for receipt of 15 tokens from the viewer 102a. Thus, the individual viewer (i.e., the viewer 102a) contribution in triggering the interactive mode of the live broadcast room is 2 percent. In other words, the viewer 102a providing 15 tokens in the live broadcast room contributes to 2 percent of the maximum aggregated score of the interactive mode. For description purposes, the probability of triggering the interactive mode is computed as a numerical value (in terms of percentage). Additionally or alternatively, the probability of triggering the interactive mode can be computed in any other format without limiting the scope of the present disclosure.

Further, the probability metric computing module 218 may render a probability metric indicator to indicate the probability of triggering the interactive mode. In other words, the probability metric computing module 218 may render the probability metric indicator for indicating the probability metric of the interactive mode computed in real-time corresponding to the input data from the viewers 102a-102c of the live broadcast room. In particular, the probability metric indicated in the probability metric indicator corresponds to an aggregated value of the input data of the viewers 102a-102c.

The probability metric computing module 218 dynamically updates the probability metric indicator based at least on one or more factors. The factors may include at least a number of viewers in the live broadcast room, time duration of the live broadcast, the input data provided by a number of viewers (e.g., the viewers 102a and 102b) among the plurality of viewers 102a-102c of the live broadcast room, a frequency of the input data provided by the at least one viewer, the value of the input data provided by each of the viewers 102a-102c, a source of the input data, and a group input data received from at least one group including one or more viewers of the plurality of viewers.

In one example scenario, the probability metric indicator is dynamically updated by the input data (i.e., the tokens) provided by each of the viewers 102a-102c in the live broadcast room. For instance, the viewers 102a and 102b may provide the 15 and 10 tokens in the live broadcast room, respectively. In this scenario, the probability of triggering the interactive mode computed for 15 and 10 tokens may be 2 percent and 1.5 percent of the maximum aggregated score (e.g., 100 percentage) of the interactive mode, respectively. The probability of triggering the interactive mode with the value of 2 percent and 1.5 percent will be updated in the live broadcast room in real-time. The probability of triggering the interactive mode which is 2 percent and 1.5 percent are individual contribution of the viewer 102a and the viewer 102b, respectively. Further, the probability of triggering the interactive mode with the value of 2 percent and 1.5 percent is indicative of the value (e.g., monetary value) of the tokens (i.e., the input data) provided by the viewers 102a and 102b.

In addition, the probability metric computing module 218 computes an aggregated score of the total input data of the plurality of viewers 102a-102c. For example, the viewers 102a-102c. In other words, the aggregated score is computed based on the total accumulated tokens (i.e., the total input data) received from the viewers 102a-102c. For example, the total accumulated tokens from the viewers 102a-102c in the live broadcast room may be 50 tokens. The aggregated score may be 10 percent of the maximum aggregated score (100 percent) for the total accumulated tokens (50 tokens) in the live broadcast room.

In another example scenario, the probability metric indicator may be dynamically updated based on the time duration of the live broadcast room. In particular, as the time duration of the live broadcast room increases, the probability metric computing module 218 updates the probability metric indicator in real-time in the live broadcast room. For instance, the live broadcast room may be active for about 25 minutes. As a result, the probability metric computing module 218 dynamically updates the probability metric indicator of the interactive mode in the live broadcast room throughout the time duration of about 25 minutes.

In another example scenario, the probability metric computing module 218 may update the probability metric indicator in real-time based on the number of viewers in the live broadcast room. It is to be noted that the number of viewers in the live broadcast room may increase or decrease. The probability metric computing module 218 updates (i.e., increases or decreases) the real-time probability metric in the interactive mode.

In another example scenario, the probability metric computing module 218 may update the probability metric indicator of the interactive mode based on the frequency of the input data provided by at least one viewer (e.g., the viewer 102a). The viewer 102a may provide the tokens multiple times or consecutively (3 times in a row) in the live broadcast room. Thus, the probability metric computing module 218 computes the probability metric based on both the factors i.e., the frequency of the tokens provided by the viewer 102a and the value (i.e., an overall value) of the tokens provided by the viewer 102a. For instance, the viewer 102a may consecutively provide the tokens for (3 times in a row). In this scenario, the probability metric computed by the application server may be 3.5 percent which includes 2.5 percent of the probability metric for the total value of the tokens provided the viewer 102a and 1.0 percent of the probability metric as a streak (or bonus) for the frequency (3 times) of the tokens provided by the viewer 102a.

In another example scenario, the probability metric computing module 218 may update the probability metric indicator based on the group input data received from at least one group including one or more viewers of the viewers 102a-102c. For instance, the at least one group may be formed in the live broadcast by grouping the viewers 102a and 102b as one group and the viewers 102c and 102b as another group. The tokens (i.e., input data) provided by the group including the viewers 102a and 102b in the live broadcast correspond to the group input data. In this scenario, the probability metric computing module 218 may take into account the tokens provided by the viewers 102a and 102b as the group input data and correspondingly compute the probability of triggering the interactive mode. In this scenario, the probability metric may increase based on the group input data provided by the group including the viewers 102a and 102b. Similarly, the probability of triggering the interactive mode is computed for the group input data received from the other group including the viewers 102c and 102a. In this scenario, the probability metric may decrease based on the group input data from the other group including the viewers 102a and 102c.

In another scenario, the probability metric computing module 218 computes the probability of triggering the interactive mode based on the source of the input data. For example, the viewers 102a-102c may have different membership levels in the live streaming interactive platform 118. The membership level of the viewers 102a-102c corresponds to the source of the input data. Thus, the probability metric computing module 218 computes the probability of triggering the interactive mode corresponding to the input data provided by the viewers 102a-102c based on their membership level (i.e., the source of the input data).

The control instruction generation module 220 includes suitable logic and/or interfaces for generating the control instruction in response to triggering the interactive mode for operating the sexual stimulation device 112 of the model user 106. As explained above, the control instruction generation module 220 generates the control instruction in response to triggering the interactive mode under the probability metric. For instance, the viewer 102a may provide 10 tokens to the model user 106 in the interactive mode. In this scenario, the control instruction generation module 220 generates the control instruction appended with the parameters such as the duration and the operating intensity corresponding to 10 tokens received from the viewer 102a. The duration may be of about 12 seconds and the operating intensity may be set as medium intensity for generating the control instruction if the input data (10 tokens) received from the viewer 102a triggers the interactive mode. The control instruction generated in the interactive mode triggers the sexual stimulation device 112 to perform the first action. In this scenario, the first action operates the sexual stimulation device 112 for about 12 seconds with medium intensity, for providing sexual stimulation to the model user 106 in the live broadcast room.

Further, the control instruction generation module 220 generates the control instruction corresponding to determining the value of the input data is within the specified range defined for the basic mode. For instance, the specified range defined for the value of the tokens (i.e., the input data) in the basic mode may be 1-10 tokens, 11-20 tokens, and the like. Accordingly, the parameters are preset for each specified range in the basic mode. The viewer 102a may provide 10 tokens to the model user 106 in the live broadcast room when the basic mode is activated. The control instruction generation module 220 determines the value of the input data (tokens) is within the specified range of 1-10 tokens. As a result, the control instruction generation module 220 generates the control instruction including the parameters that are preset for the specified range (1-10 tokens). In an embodiment, the parameters such as the duration and the operating intensity preset for the range 1-10 tokens may be 10 seconds and medium intensity, respectively. The control instruction generated in the basic mode triggers the sexual stimulation device 112 to perform the second action. In this scenario, the second action operates the sexual stimulation device 112 for about 10 seconds with medium intensity, for providing sexual stimulation to the model user 106 in the live broadcast room. It is evident that, in the interactive mode, the value of each token provided by the viewer 102a is accounted for operating the sexual stimulation device 112. In other words, the interactive mode is triggered for any value of the tokens, and the control instruction is generated for each value of the tokens. To that effect, as the number of tokens increases, the operating intensity and/or time of operating the sexual stimulation device 112 may increase.

The interactive component rendering module 222 includes suitable logic and/or interface for rendering interactive components in the live broadcast room. In one scenario, the interactive component rendering module 222 renders an interactive component to the viewers 102a-102c in the live broadcast room in response to determining the probability metric of the interactive mode attains the maximum aggregated score (100 percent) in the interactive mode. For example, the interactive component may include hidden effects on critical hits.

In addition, the control instruction generation module 218 generates a control instruction corresponding to the maximum aggregated score of the probability metric in the interactive for operating the sexual stimulation device 112 to perform the first action. In general, the parameters (i.e., time duration and the operating intensity) of the control instruction are selected based on the maximum aggregated score of the probability metric. In this scenario, the control instruction operates the sexual stimulation device 112 to perform the first action. The first action provides the sexual stimulation to the model user 106 corresponding to the maximum aggregated score of the probability metric in the interactive mode.

In another scenario, the interactive component rendering module 222 is configured to determine a condition of triggering the interactive component in the interactive mode. In particular, the interactive component rendering module 222 determines the condition of triggering the interactive mode based at least on the input data provided by the at least one viewer exceeding a first threshold value. For example, the first threshold value may be set as 50 tokens for an individual viewer in the interactive mode. In one case, the viewer 102a may provide 55 tokens (i.e., the input data). In this case, the application server 200 determines that the tokens (e.g., 55 tokens) provided by the viewer 102a in the interactive mode exceed the first threshold value (e.g., 50 tokens). Thus, the interactive component rendering module 222 determines that the tokens provided by the viewer 102a satisfy the condition of triggering the interactive component. To that effect, the interactive component rendering module 222 renders one or more preset effects associated with the interactive component to the viewer 102a in the live broadcast room.

In addition, the control instruction generation module 218 generates a control instruction corresponding to the input data exceeding the first threshold value for operating the sexual stimulation device 112 to perform a third action. The sexual stimulation device 112 performing the third action provides sexual stimulation to the model user 106 corresponding to input data exceeding the first threshold value.

In a similar manner, the interactive component rendering module 222 renders the interactive component to a group including the one or more viewers (e.g., the viewers 102a and 102b). In particular, the interactive component rendering module 222 determines if a group input data from the group including the viewers (e.g., the viewers 102a and 102b) exceeds a second threshold value. For example, the second threshold value may be set as 100 tokens for a group in the interactive mode. In one case, the group including the viewers 102a and 102b may provide 105 tokens (i.e., the input data). In this case, the application server 200 determines that the 105 tokens (i.e., the group input data) provided by the group including the viewers 102a and 102b exceeds the second threshold value (e.g., 100 tokens). As a result, the interactive component rendering module 222 renders the interactive component to a group including the viewers 102a and 102b in the interactive mode. Additionally, the interactive component rendering module 222 renders the preset effects associated with the interactive component to the group including the viewers 102a and 102b in case of determining the condition of triggering the interactive component in the live broadcast room.

Additionally, the application server 200 may be configured to monitor inputs of the at least one viewer (e.g., the viewer 102a) provided on an actionable element rendered in the live broadcast room. The inputs are provided via a user device (e.g., the user device 104a) of the viewer 102a. The inputs may include, but are not limited to, a magnitude of force applied on the actionable element and a selection frequency of the actionable element. In other words, the viewer 102a is required to provide inputs (i.e., gesture inputs) on the actionable element rendered in the user device 104a for providing the input data in the live broadcast room. As explained above, the viewer 102a is required to apply force on the actionable element to provide the input data. As such, the application server 200 is configured to acquire information from the user device 104a related to the magnitude of force applied on the actionable element. Moreover, the application server 200 acquires information from the user device 104a related to the selection frequency of the actionable element. Thereafter, the application server 200 determines the value of the input data based on the magnitude of force applied to the actionable element and the selection frequency of the actionable element. It is to be noted that the viewers 102a-102c may utilize the actionable element to provide the input data in both the operating modes (i.e., the basic mode and the interactive mode) of the live broadcast room.

Figure 3:
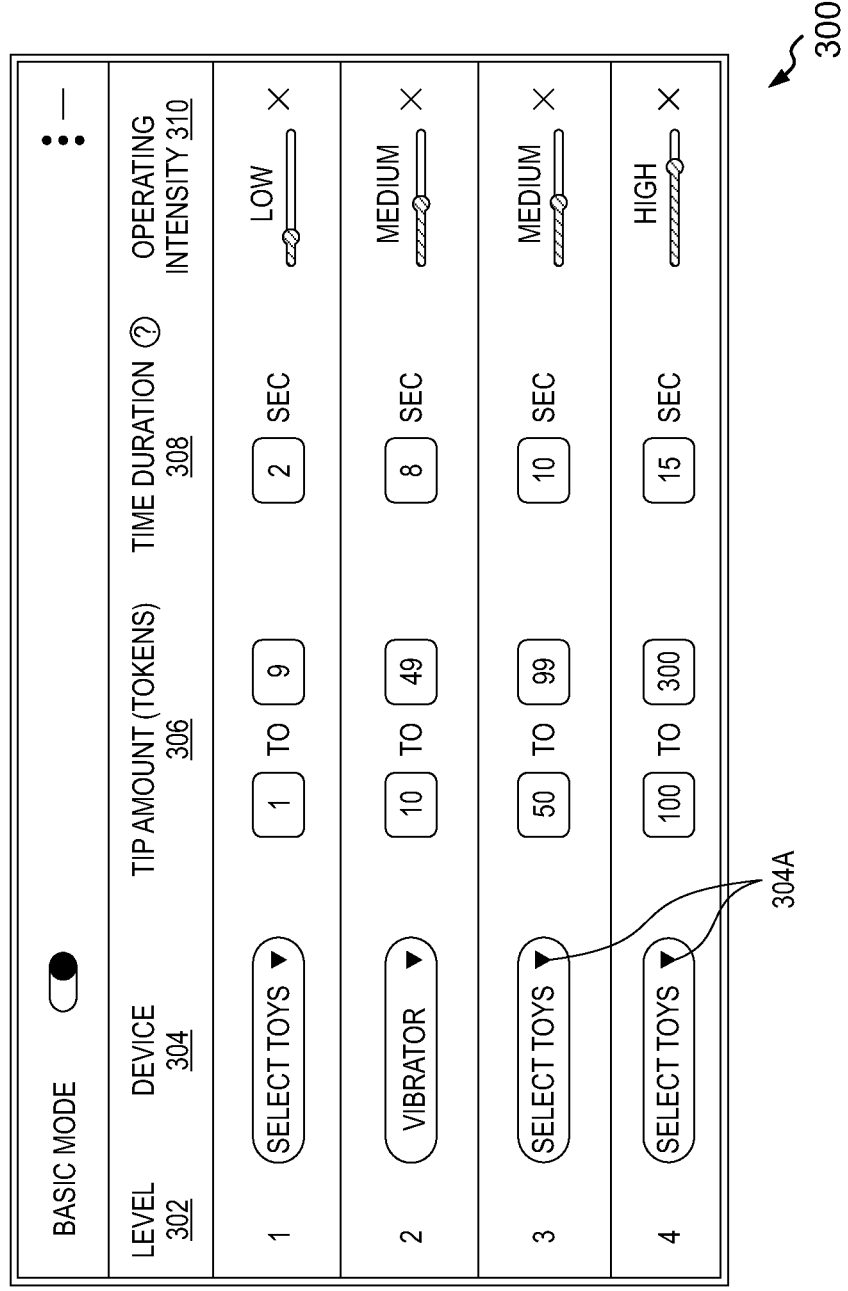
FIG. 3 illustrates an example representation of a user interface (UI) depicting parameters for a control instruction defined in a live streaming interactive platform, in accordance with an embodiment of the present disclosure.

FIG. 3 illustrates an example representation of a user interface (UI) 300 depicting the parameters for the control instruction defined in the live streaming interactive platform 118, in accordance with an embodiment of the present disclosure. The parameters of the control instruction are defined in the live streaming interactive platform 118 corresponds to the basic mode. As explained above, the basic mode is selected by default in the live streaming interactive platform 118. Further, in case of deactivating the interactive mode in the live broadcast room, the basic mode is selected automatically for the live broadcast room. The selection of the basic mode is indicated using an indicator 302 of the UI 300. Additionally, the model user 106 may activate or deactivate the basic mode by providing a selection input to the indicator 302.

The UI 300 is depicted to include a column 302 (exemplarily depicted as 'LEVEL'). The levels (exemplarily depicted as '1', '2', '3', '4', . . . ) depicted in the column 302 are predefined in the live streaming interactive platform 118.

Further, the UI 300 is depicted to include a column 304 (exemplarily depicted as 'DEVICE') for allowing the model user 106 to select a type of sexual stimulation device for each level depicted in the column 302. The type of sexual stimulation device may be selected based on a gender of the model user 106. The model user 106 may provide inputs on a drop-down menu 304a of the column 304 for selecting the type of sexual stimulation device for each level. Upon providing inputs on the drop-down menu 304a, a list of sexual stimulation devices may be prompted in the UI 300 (not shown in figures). The model user 106 may select the sexual stimulation device from the list. Thereafter, the selected sexual stimulation device is displayed in the UI 300 (as shown in FIG. 3).

The UI 300 is further depicted to include a column 306 (exemplarily depicted as 'TOKENS'). The column 306 depicts the specified range (exemplarily depicted as '1 to 9' for LEVEL 1) of the tokens (or the input data) for each level in the basic mode. In an embodiment, the application server 200 may allow the model user 106 to modify the specified range of the tokens for each level by providing inputs in the column 306.

The UI 300 further depicts a column 308 (exemplarily depicted as 'TIME DURATION') and a column 310 (exemplarily depicted as 'OPERATING INTENSITY'). The column 308 depicts the time duration (exemplarily depicted as '2 sec' for LEVEL 1) predefined for the corresponding specified range (e.g., '1 to 9') defined in the basic mode. Further, the column 310 depicts the operating intensity (exemplarily depicted as 'LOW INTENSITY') predefined for the corresponding specified range (e.g., '1 to 9') in the basic mode. As explained above, the time duration and the operating intensity are the parameters that are appended in the control instruction for operating the sexual stimulation device of the model user 106. In an embodiment, the model user 106 may modify the time duration and the operating intensity for each level by providing inputs in the corresponding columns 308 and 310. For instance, a viewer (e.g., the viewer 102a) may provide 24 tokens (i.e., the input data) to the model user 106 of the live broadcast room in the basic mode. In this scenario, the applications server 200 determines that the input data provided by the viewer 102a is within the specified range of '10 to 49'. As a result, the application server 200 selects the time duration to be '8 sec' and the operating intensity as 'medium intensity' and generates the control instruction for operating the sexual stimulation device 112 of the model user 106.

Figure 4A:
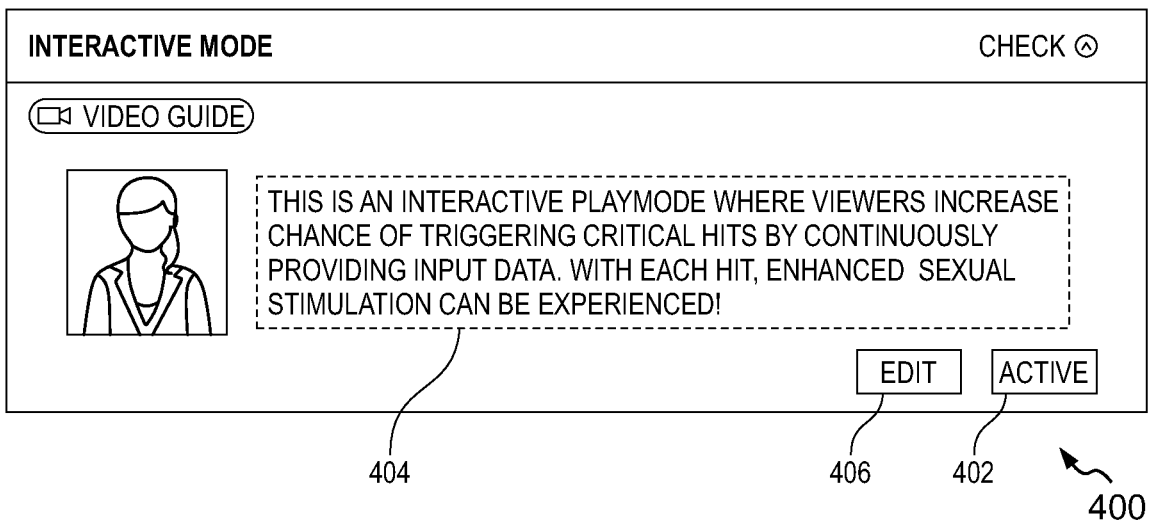
FIGS. 4A and 4B illustrate example representations of a user interface (UI) for selection of the interactive mode in the live broadcast room, in accordance with an embodiment of the present disclosure.

FIG. 4A illustrates an example representation of a user interface (UI) 400 for selection of the interactive mode in the live broadcast room, in accordance with an embodiment of the present disclosure. As explained above, the interactive mode can be activated automatically or manually. In one scenario, the UI 400 may be rendered to the model user 106 on the user device 108 for activating the interactive mode in the live broadcast room. In particular, the model user 106 may provide a selection input on an option 402 (exemplarily depicted as 'ACTIVE') for activating the interactive mode in the live broadcast room. Further, the UI 400 is depicted to include a section 404 for depicting general instructions/information related to the interactive mode to the model user 106. The model user 106 may modify general interactive mode settings by providing inputs on an option 406 (exemplarily depicted as 'EDIT').

In another scenario, the interactive mode may be triggered automatically based on completing at least one predefined condition of the interactive mode. The at least one predefined condition may include, but not limited to, the number of viewers in the live broadcast room, the duration of the model live broadcast room, c. number of viewers providing the input data, number of tokens received in the live broadcast room. In this scenario, the application server 200 may automatically prompt the UI 400 to the model user 106 to allow the model user 106 to activate the interactive mode in the live broadcast room. In another scenario, the application server 200 may automatically activate the interactive mode in the live broadcast room of the model user 106 based on preset instructions provided by the model user 106 in the live streaming interactive platform 118. In this scenario, the UI 400 may not be prompted to the model user 106 to activate the interactive mode in the live broadcast room of the model user 106.

Figure 4B:
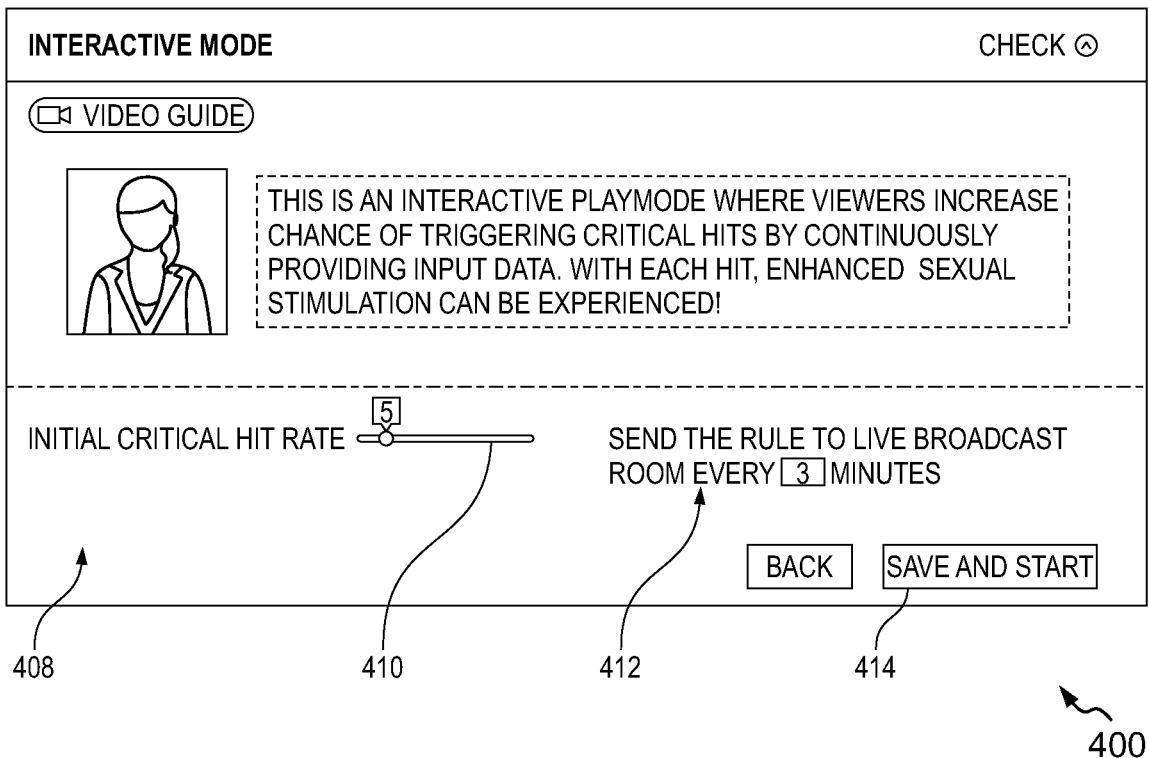

Referring to FIG. 4B, the UI 400 is depicted to include an extended menu 408 upon selection of the option 406. The extended menu 408 is depicted to include general interactive settings such as an initial critical hit rate and display of rules (e.g., the factors of the interactive mode). The initial critical hit rate may correspond to the number of tokens required to trigger the interactive mode during the initial stage of the interactive mode. The model user 106 may set the initial critical hit rate by providing inputs on a sliding bar 410. Specifically, the model user 106 may provide a sliding input on the sliding bar 410 for adjusting the initial critical hit rate of the live broadcast room. Further, the rules (or the factors) of the interactive mode may be displayed in the live broadcast room for the viewers 102a-102c, thus enabling the viewers 102a-102c to perform the actions (e.g., provide the input data) accordingly in the live broadcast room. The rules of the interactive mode may be displayed at regular intervals in the live broadcast room. In one scenario, the interval (see, 412 of FIG. 4B) of displaying the rules in the live broadcast room may be predefined for the interactive mode in the live streaming interactive platform 118. In another scenario, the model user 106 may provide inputs related to the interval for displaying the rules in the live broadcast room. Upon providing the inputs in the extended menu 408, the model user 106 may save the changes for the interactive mode by providing inputs on a button 414 (exemplarily depicted as 'SAVE AND EXIT').

Figure 5B:
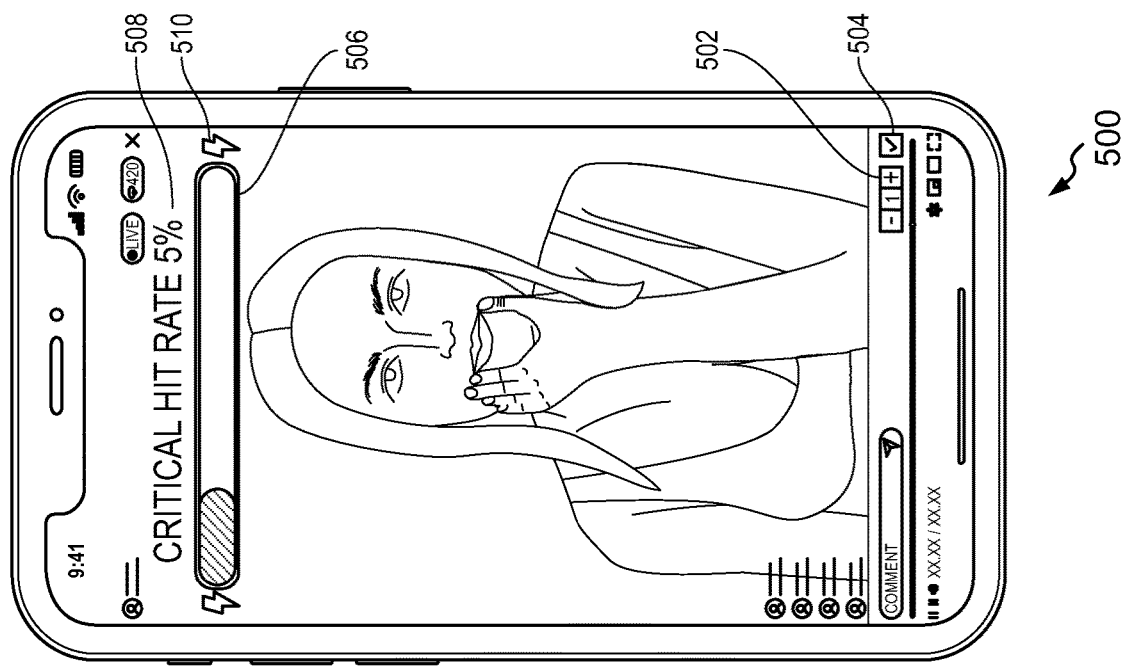
FIGS. 5A, 5B, 5C, and 5D illustrate example representations of a user interface (UI) depicting the live broadcast room of the model user displayed to at least one viewer, in accordance with an embodiment of the present disclosure.
Figure 5A:
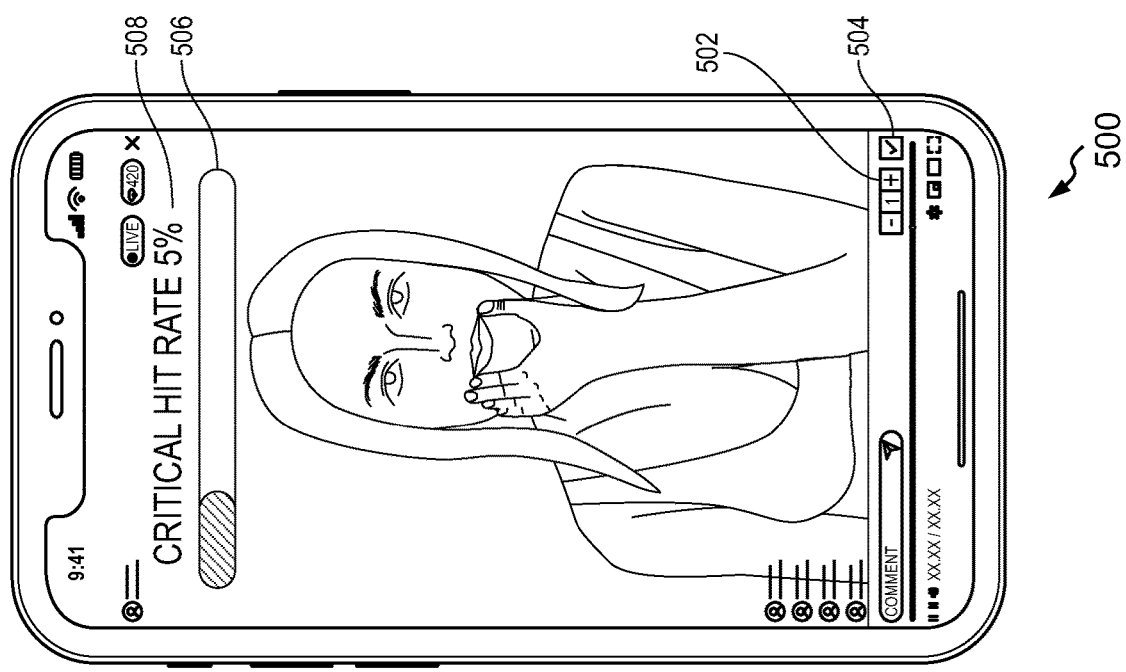

FIG. 5A illustrates an example representation of a user interface (UI) 500 depicting the live broadcast room of the model user 106 displayed to at least one viewer, in accordance with an embodiment of the present disclosure. For example, the live broadcast room of the model user 106 is displayed to the viewer 102a. As shown, the UI 500 is depicted to include an input element 502 for allowing the viewer 102a to provide the input data. In particular, the viewer 102a may select the input data (i.e., the tokens) using the input element 502. The number of tokens selected by the viewer 102a is displayed in the input element 502. Upon selecting the input data, the viewer 102a may transmit the input data to the model user 106 by providing an input on an actionable icon 504. Additionally, or alternatively, the viewer 102a may transmit the input data to the model user 106 in the form of a voice command. The user device 104a of the viewer 102a identifies the voice command of the viewer 102a and corresponding action is performed in the live streaming interactive platform 118 for providing the input data (i.e., tokens) to the model user 106 in the live broadcast room. In particular, the viewer 102a may select the number of tokens using the input element 502 and then provide a voice command for submitting the tokens. In this scenario, the voice command triggers may trigger the actionable icon 504 for providing the tokens to the model user 106 in the live broadcast room.

Further, in case of the interactive mode, the UI 500 depicts a probability metric indicator 506 in the live broadcast room. The probability metric indicator 506 indicates the probability metric of the interactive mode corresponding to the input data from the viewers 102a-102c of the live broadcast room. Furthermore, the probability metric in the probability metric indicator 506 is dynamically updated based on the factors as explained above.

The UI 500 is further depicted to include a dynamic information field 508 for indicating critical hit rate. The critical hit rate is depicted as 100%. It is to be understood that the critical hit rate depicted in the dynamic information field 508 corresponds to the maximum aggregated score of the interactive mode. Additionally, the critical hit rate of the individual viewer (e.g., the viewer 102a) may be rendered in the UI 500. In one scenario, the viewer 102a may provide 10 tokens in the interactive mode. The probability of triggering the interactive mode corresponding to 10 tokens may be 5 percent of the maximum aggregated score. The probability of triggering the interactive mode (e.g., 5%) corresponding to the input data (e.g., 10 tokens) provided by the viewer 102a may be indicated in the dynamic information field 508 (as shown in FIG. 5B). In addition, the UI 500 may be depicted to include an effect (see, 510) for indicating the update of the probability metric (or trigger of the interactive mode) corresponding to the input data provided by the viewer 102a. In one scenario, the effect 510 may be rendered in the form of stickers (as shown in FIG. 5B). In another scenario, the effect 510 may be rendered in the form of a numeral value (as shown in FIG. 5C). The numerical value is exemplarily depicted as "+2s" that indicates an increase in the time duration of the sexual stimulation device 112 associated with the model user 106 due to the probability of triggering the interactive mode. In other words, the effect 510 specifies that the operating time of the sexual stimulation device 112 is increased by 2 seconds (exemplarily represented as "+2s") compared to the time in the basic mode.

Figure 5D:
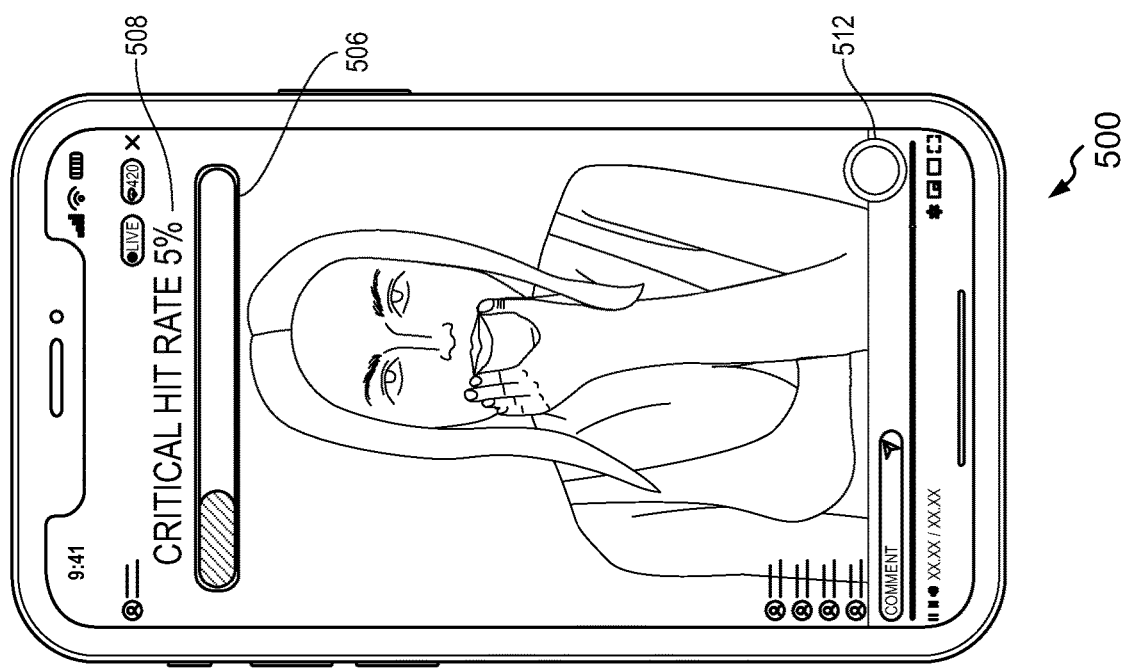
Figure 5C:
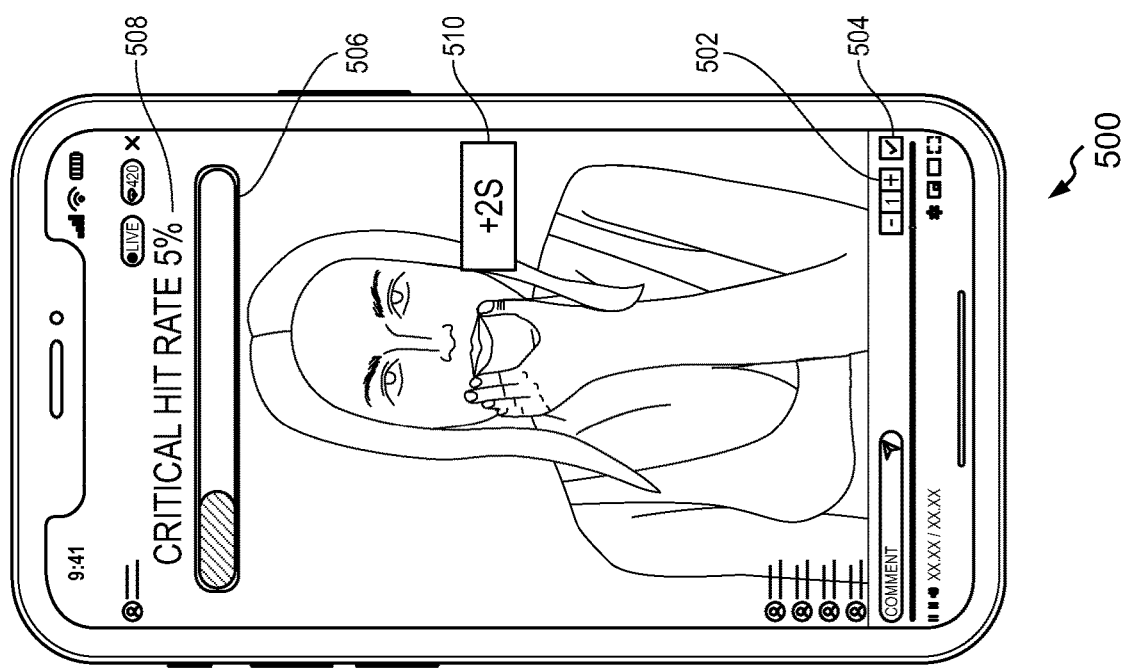

Referring to FIG. 5D, the viewers 102a-102c may provide the input data by using an actionable element 512 rendered in the live broadcast room (i.e., the UI 500). As explained above, the viewers 102a-102c may provide inputs (e.g., gestures input) on the actionable element 512. The inputs may include, but not limited to, a magnitude of force applied on the actionable element 512 and a selection frequency of the actionable element 512. In particular, the gesture input on the actionable element 512 corresponds to applying force on the actionable element 512 to provide the input data. As such, the application server 200 acquires information from the user device 104a related to the magnitude of force applied on the actionable element 512. Moreover, the application server 200 acquires information from the user device 104a related to the selection frequency of the actionable element 512. Thereafter, the application server 200 determines the value of the input data based on the magnitude of force applied to the actionable element 512 and the selection frequency of the actionable element 512. In an embodiment, the actionable element 512 may be predefined at one or more locations in the UI 500. In this scenario, the viewers 102a-102c may utilize the actionable element 512 to provide the input data in the live broadcast room. In particular, the viewers 102a-102c may provide touch input at the one or more locations predefined in the UI 500 for providing the input data in the live broadcast room.

In an embodiment, the probability metric indicator 506 may be adjusted for providing the input data in the live broadcast room. In particular, the viewer 102a may slide over the probability metric indicator 506 for providing the input data (or the tokens) in the live broadcast room. That is, the probability metric indicator 506 can be regarded as the actionable element (e.g., the actionable element 512).

Figure 6A:
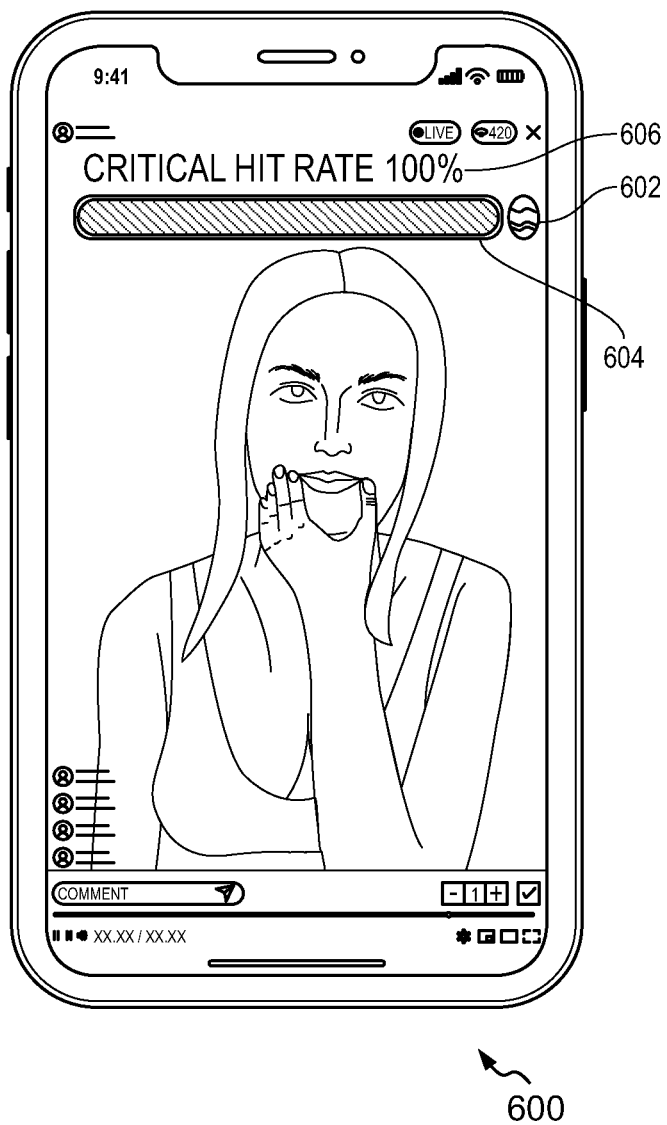
FIGS. 6A, 6B, and 6C illustrate example representations of a user interface (UI) depicting rendering of an interactive component and actions associated with triggering of the interactive component, in accordance with an embodiment of the present disclosure.
Figure 6C:
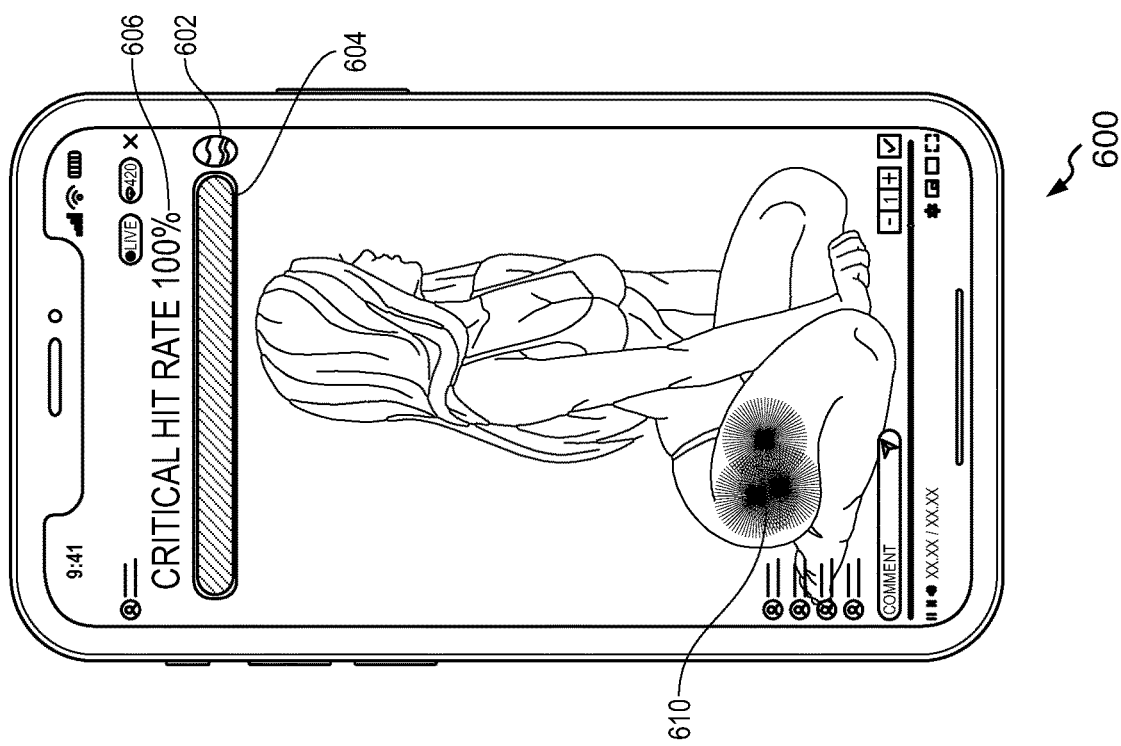
Figure 6B:
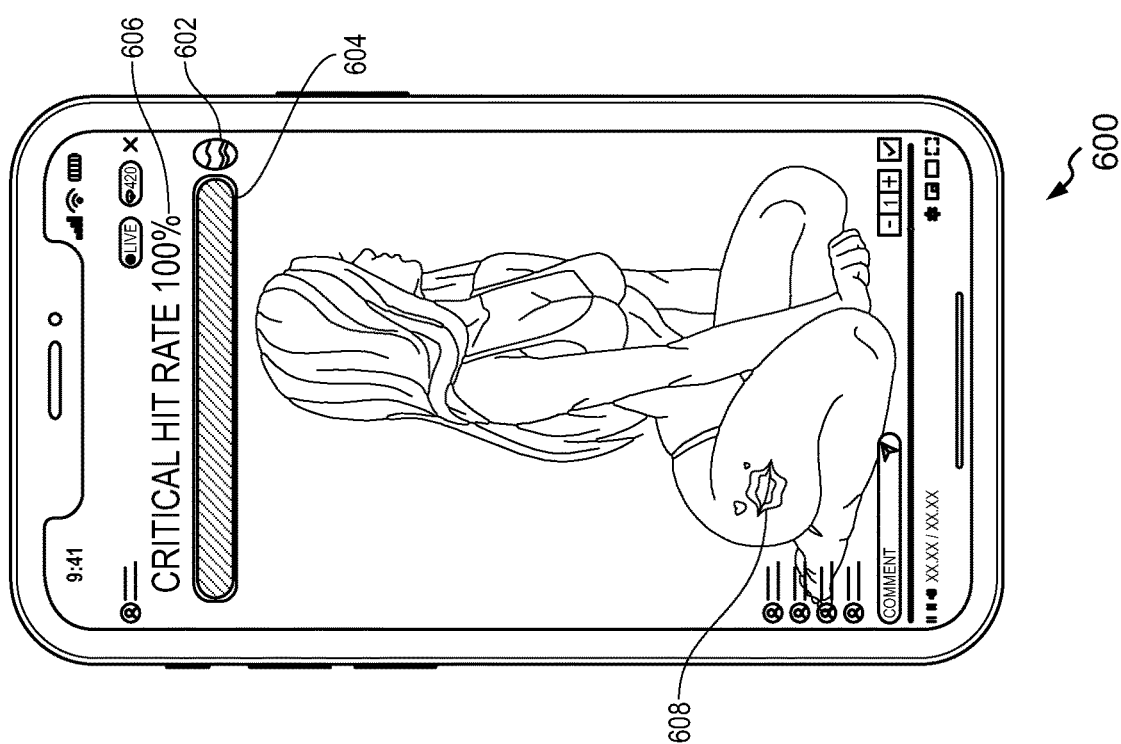

FIGS. 6A, 6B, and 6C, illustrate an example representation of user interfaces (UIs) depicting the rendering of an interactive component and actions associated with triggering the interactive component, in accordance with an embodiment of the present disclosure. For illustration purposes the UIs depicted in the FIGS. 6A-6C are depicted as the UIs displayed on a Smartphone. It will be apparent that the UIs of FIGS. 6A-6C is displayed in the similar manner on other user devices such as, but not limited to, laptop computer, tablet, etc.

Referring to FIG. 6A, a user interface (UI) 600 is depicted to the viewers 102a-102c of the live broadcast room. The UI 600 is depicted to include an interactive component 602. The interactive component 602 is depicted to the viewers 102a-102c in the live broadcast room when the probability metric of the interactive mode attains the maximum aggregated score in the interactive mode. The maximum aggregated score is depicted in a dynamic information field 604. Further, the probability metric corresponding to the maximum aggregated score is updated in a probability metric indicator 606. The dynamic information field 604 and the probability metric indicator 606 are examples of the dynamic information field 604 and the probability metric indicator 506. Further, the interactive component 602 may include hidden effects on critical hits. For instance, the critical hits correspond to satisfying at least one factor among the one or more factors defined in the interactive mode by the viewer. Some examples of at least one factor may be the frequency of the input data (tokens) provided by the viewer 102a. In this scenario, the viewer 102a may be provided with the hidden effects (e.g., showing a private part of the model user 106) in the live broadcast room.

In addition, the application server 200 may render one or more preset effects associated with the interactive component 602 to the at least one viewer in the live broadcast room. As explained above, the application server 200 continuously monitors the live broadcast room to determine the condition of triggering the interactive component 602 in the interactive mode. The condition of triggering the interactive component 602 occurs when the probability metric corresponding to the input data provided by the viewer (e.g., the viewer 102a) exceeds the first threshold value. In this scenario, the application server 200 renders the preset effects (as shown in FIGS. 6B and 6C) associated with the interactive component 602.

In one scenario, the application server 200 may render a sicker (see, 608 of FIG. 6B) on body parts of the model user 106 as the preset effect associated with the interactive component 602. In another scenario, the application server 200 may render a special effect (see, 610 of FIG. 6C) on the body parts of the model user 106 as the preset effect associated with the interactive component.

Figure 7:
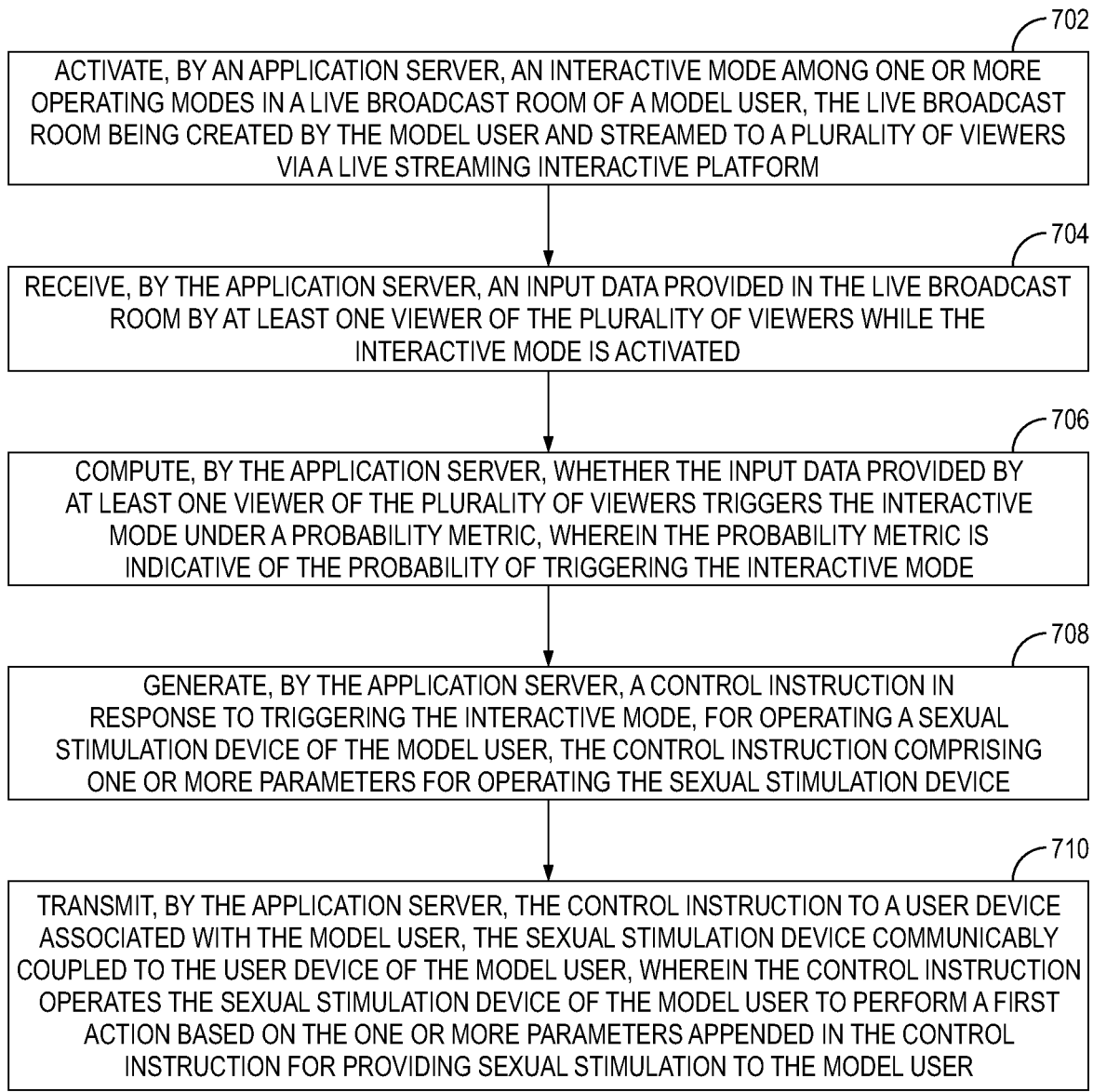
FIG. 7 illustrates a flow diagram of a computer-implemented method for providing interactive adult entertainment in the live broadcast room, in accordance with an embodiment of the present disclosure.

FIG. 7 illustrates a flow diagram of a computer-implemented method 700 for providing interactive adult entertainment in the live broadcast room, in accordance with an embodiment of the present disclosure. The method 700 depicted in the flow diagram may be executed by, for example, the application server 200 or the application server 116. Operations of the flow diagram of the method 700, and combinations of the operations in the flow diagram of the method 700, may be implemented by, for example, hardware, firmware, a processor, circuitry, and/or a different device associated with the execution of software that includes one or more computer program instructions. It is noted that the operations of the method 700 can be described and/or practiced by using a system other than these server systems. The method 700 starts at operation 702.

At operation 702, the method 700 includes activating, by the application server 200, an interactive mode among one or more operating modes in a live broadcast room of the model user 106. The live broadcast room is created by the model user 106 and streamed to the plurality of viewers 102a-102c via the live streaming interactive platform 118.

At operation 704, the method 700 includes receiving, by the application server 200, an input data provided in the live broadcast room by the at least one viewer 102a of the plurality of viewers 102a-102c while the interactive mode is activated.

At operation 706, the method 700 includes computing, by the application server 200, whether the input data provided by at least one viewer of the plurality of viewers triggers the interactive mode under a probability metric. Further, the probability metric is indicative of the probability of triggering the interactive mode.

At operation 708, the method 700 includes generating, by the application server 200, a control instruction in response to triggering the interactive mode, for operating the sexual stimulation device 112 of the model user 106. The control instruction includes one or more parameters for operating the sexual stimulation device 112.

At operation 710, the method 700 includes transmitting, by the application server 200, the control instruction to a user device 108 associated with the model user 106. The sexual stimulation device 112 is communicably coupled to the user device 108 of the model user 106. The control instruction operates the sexual stimulation device 112 of the model user 106 to perform a first action based on the one or more parameters appended in the control instruction for providing sexual stimulation to the model user 106.

Figure 8:
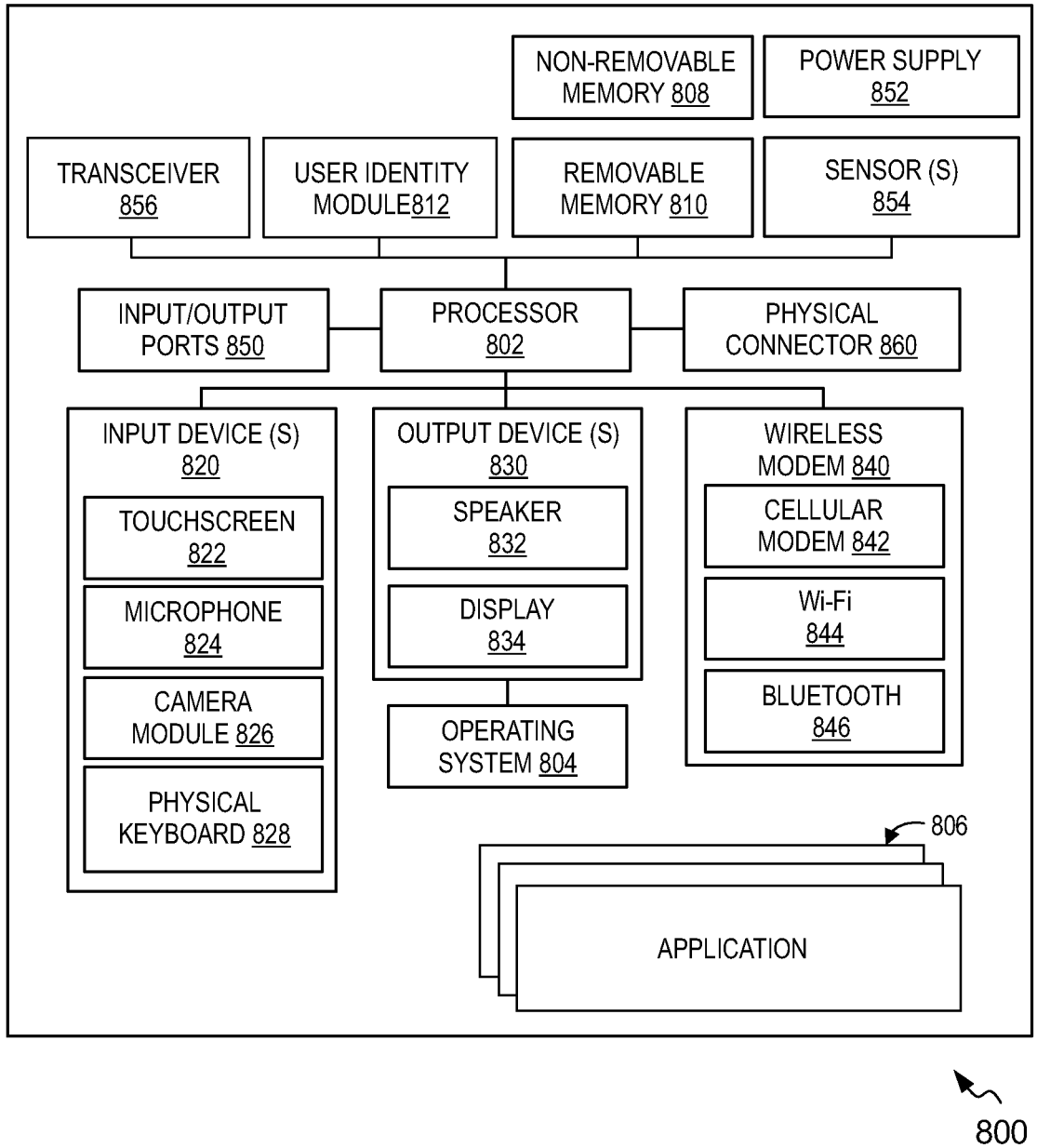
FIG. 8 is a simplified block diagram of an electronic device capable of implementing various embodiments of the present disclosure.

FIG. 8 is a simplified block diagram of an electronic device 800 capable of implementing various embodiments of the present disclosure. For example, the electronic device 800 may correspond to the user devices 104a-104c and 108 of FIG. 1. The electronic device 800 is depicted to include one or more applications 806. For example, the one or more applications 806 may include components of the live streaming interactive platform 118 of FIG. 1. One of the one or more applications 806 installed on the electronic device 800 is capable of communicating with a server (i.e., the application server 200 or the application server 116) for providing interactive adult entertainment in the live broadcast room.

It should be understood that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an embodiment may include more, fewer or different components than those described in connection with the embodiment of the FIG. 8. As such, among other examples, the electronic device 800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and supports for one or more operations of the application (see, the applications 806) that implements one or more of the innovative features described herein. In addition, the applications 806 may include common mobile computing applications (e.g., telephony applications, email applications, calendars, contact managers, web browsers, messaging applications) or any other computing application.

The illustrated electronic device 800 includes one or more memory components, for example, a non-removable memory 808 and/or removable memory 810. The non-removable memory 808 and/or the removable memory 810 may be collectively known as a database in an embodiment. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to, a speaker 832 and a display 834. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854 for example, an accelerometer, a gyroscope, a compass, or an infrared proximity sensor for detecting the orientation or motion of the electronic device 800 and biometric sensors for scanning biometric identity of an authorized user, a transceiver 856 (for wirelessly transmitting analog or digital signals) and/or a physical connector 860, which can be a USB port, IEEE 1294 (Fire Wire) port, and/or RS-232 port. The illustrated components are not required or all-inclusive, as any of the components shown can be deleted and other components can be added.

The disclosed method with reference to FIG. 7, or one or more operations of the application server 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the application server 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
activating, by an application server, an interactive mode among one or more operating modes in a live broadcast room of a model user, the live broadcast room being created by the model user and streamed to a plurality of viewers via a live streaming interactive platform;
receiving, by the application server, an input data provided in the live broadcast room by at least one viewer of the plurality of viewers while the interactive mode is activated;
computing, by the application server, whether the input data provided by at least one viewer of the plurality of viewers triggers the interactive mode under a probability metric, wherein the probability metric is indicative of the probability of triggering the interactive mode, wherein the probability metric is dynamically increased from an initial value to a maximum aggregated score based, at least, on accumulation of all tokens corresponding to the input data, and wherein the increase in the probability metric corresponds to an increase in the accumulated tokens corresponding to the input data;
generating, by the application server, a control instruction in response to triggering the interactive mode, for operating a sexual stimulation device of the model user, the control instruction comprising one or more parameters for operating the sexual stimulation device; and
transmitting, by the application server, the control instruction to a user device associated with the model user, the sexual stimulation device communicably coupled to the user device of the model user, wherein the control instruction operates the sexual stimulation device of the model user to perform a first action based on the one or more parameters appended in the control instruction for providing sexual stimulation to the model user.

2. The computer-implemented method as claimed in claim 1, further comprising:
rendering, by the application server, a probability metric indicator in the live broadcast room for indicating the probability metric of the interactive mode computed in real-time corresponding to the input data from the plurality of viewers of the live broadcast room; and
dynamically updating, by the application server, the probability metric in the probability metric indicator based at least on one or more factors.

3. The computer-implemented method as claimed in claim 2, wherein the one or more factors comprise at least:
a number of viewers in the live broadcast room, time duration of the live broadcast,
the input data provided by a number of viewers among the plurality of viewers of the live broadcast room,
a frequency of the input data provided by the at least one viewer,
a source of the input data, and
a group input data received from at least one group including one or more viewers of the plurality of viewers.

4. The computer-implemented method as claimed in claim 1, further comprising:
rendering, by the application server, an interactive component to the plurality of viewers in the live broadcast room in response to determining the probability metric of the interactive mode attains a maximum aggregated score in the interactive mode; and
generating, by the application server, a control instruction corresponding to the maximum aggregated score of the probability metric in the interactive mode when receiving input data provided by the plurality of viewers, wherein the control instruction generated corresponding to the maximum aggregated score operates the sexual stimulation device to perform the first action, and wherein the sexual stimulation device performing the first action provides sexual stimulation to the model user corresponding to the maximum aggregated score of the probability metric in the interactive mode.

5. The computer-implemented method as claimed in claim 4, further comprising:
determining, by the application server, a condition of triggering the interactive component in the interactive mode based at least on the input data provided by the plurality of viewers exceeding a first threshold value; and
rendering, by the application server, one or more preset effects associated with the interactive component to the plurality of viewers in the live broadcast room in response to determining the condition of triggering the interactive component in the interactive mode.

6. The computer-implemented method as claimed in 5, further comprising generating, by the application server, a control instruction corresponding to the input data provided by the plurality of viewers exceeding the first threshold value for operating the sexual stimulation device to perform a third action, wherein the sexual stimulation device performing the third action provides sexual stimulation to the model user corresponding to the input data provided by the plurality of viewers exceeding the first threshold value.

7. The computer-implemented method as claimed in claim 5, further comprising
rendering, by the application server, the interactive component to one or more viewers of the plurality of viewers in response to determining a group input data from the one or more viewers of the plurality of viewers exceeding a second threshold value.

8. The computer-implemented method as claimed in 1, further comprising:
monitoring, by the application server, inputs of the at least one viewer of the plurality of viewers provided on an actionable element rendered in the live broadcast room, wherein the inputs correspond to a gesture input provided by the at least one viewer on the actionable element rendered in the live broadcast room, the inputs comprising a magnitude of force applied on the actionable element and a selection frequency of the actionable element; and determining, by the application server, a value of the input data based at least on the inputs on the actionable element to generate the control instruction.

9. The computer-implemented method as claimed in claim 1, further comprising:
activating, by the application server, a basic mode among the one or more operating modes in the live broadcast room, wherein the basic mode is activated by default while the interactive mode is deactivated;
receiving, by the application server, the input data from the at least one viewer of the plurality of viewers while the basic mode is activated;
determining, by the application server, a value of the input data is within a specified range defined for the basic mode; and
generating, by the application server, a control instruction for operating the sexual stimulation device of the model user to perform a second action, wherein the one or more parameters of the control instruction are preset corresponding to the specified range in the basic mode, and wherein the sexual stimulation device performing the second action provides sexual stimulation to the model user.

10. An application server, comprising:
a communication interface;
a memory storing executable instructions; and
a processor operatively coupled with the communication interface and the memory, the processor configured to execute the executable instructions to cause the application server to at least:
activate an interactive mode among one or more operating modes in a live broadcast room of a model user, the live broadcast room being created by the model user and streamed to a plurality of viewers via a live streaming interactive platform,
receive an input data provided in the live broadcast room by at least one viewer of the plurality of viewers while the interactive mode is activated,
compute whether the input data provided by at least one viewer of the plurality of viewers triggers the interactive mode under a probability metric, wherein the probability metric is indicative of the probability of triggering the interactive mode, wherein the probability metric is dynamically increased from an initial value to a maximum aggregated score based, at least, on accumulation of all tokens corresponding to the input data, and wherein the increase in the probability metric corresponds to an increase in the accumulated tokens corresponding to the input data,
generate a control instruction in response to triggering the interactive mode, for operating a sexual stimulation device of the model user, the control instruction comprising one or more parameters for operating the sexual stimulation device, and
transmit the control instruction to a user device associated with the model user, the sexual stimulation device communicably coupled to the user device of the model user, wherein the control instruction operates the sexual stimulation device of the model user to perform a first action based on the one or more parameters appended in the control instruction for providing sexual stimulation to the model user.

11. The application server as claimed in claim 10, wherein the application server is further caused to at least:
render a probability metric indicator in the live broadcast room for indicating the probability metric of the interactive mode computed in real-time corresponding to the input data from the plurality of viewers of the live broadcast room; and
dynamically update the probability metric in the probability metric indicator based at least on one or more factors.

12. The application server as claimed in claim 11, wherein the one or more factors comprises at least:
a number of viewers in the live broadcast room,
time duration of the live broadcast,
the input data provided by a number of viewers among the plurality of viewers of the live broadcast room,
a frequency of the input data provided by the at least one viewer,
a source of the input data, and
a group input data received from at least one group including one or more viewers of the plurality of viewers.

13. The application server as claimed in claim 10, wherein the application server is further caused to at least:
render an interactive component to the plurality of viewers in the live broadcast room in response to determining the probability metric of the interactive mode attains a maximum aggregated score in the interactive mode; and
generate a control instruction corresponding to the maximum aggregated score of the probability metric in the interactive mode when receiving input data provided by the plurality of viewers, wherein the control instruction generated corresponding to the maximum aggregated score operates the sexual stimulation device to perform the first action, and wherein the sexual stimulation device performing the first action provides sexual stimulation to the model user corresponding to the maximum aggregated score of the probability metric in the interactive mode.

14. The application server as claimed in claim 13, wherein the application server is further caused to at least:
determine a condition of triggering the interactive component in the interactive mode based at least on the input data provided by the plurality of viewers exceeding a first threshold value; and
render one or more preset effects associated with the interactive component to the plurality of viewers in the live broadcast room in response to determining the condition of triggering the interactive component in the interactive mode.

15. The application server as claimed in claim 14, wherein the application server is further caused to at least:
generate a control instruction corresponding to the input data provided by the plurality of viewers exceeding the first threshold value for operating the sexual stimulation device to perform a third action, wherein the sexual stimulation device performing the third action provides sexual stimulation to the model user corresponding to the input data provided by the plurality of viewers exceeding the first threshold value.

16. The application server as claimed in claim 14, wherein the application server is further caused to at least:
render the interactive component to one or more viewers of the plurality of viewers in response to determining a group input data from the one or more viewers of the plurality of viewers exceeding a second threshold value.

17. The application server as claimed in claim 10, wherein the application server is further caused to at least:

monitor inputs of the at least one viewer of the plurality of viewers provided on an actionable element rendered in the live broadcast room, wherein the inputs correspond to a gesture input provided by the at least one viewer on the actionable element rendered in the live broadcast room, the inputs comprising a magnitude of force applied on the actionable element and a selection frequency of the actionable element; and determine a value of the input data based at least on the inputs on the actionable element to generate the control instruction.

18. The application server as claimed in claim 10, wherein the application server is further caused to at least:

activate a basic mode among the one or more operating modes in the live broadcast room, wherein the basic mode is activated by default while the interactive mode is deactivated; receive the input data from the at least one viewer of the plurality of viewers while the basic mode is activated;

determine a value of the input data is within a specified range defined for the basic mode; and generate a control instruction for operating the sexual stimulation device of the model user to perform a second action, wherein the one or more parameters of the control instruction are preset corresponding to the specified range in the basic mode, and wherein the sexual stimulation device performing the second action provides sexual stimulation to the model user.

19. A non-transitory computer-readable storage medium comprising computer-executable instructions that, when executed by at least a processor of an application server, cause the application server to perform a method comprising:

activating an interactive mode among one or more operating modes in a live broadcast room of a model user, the live broadcast room being created by the model user and streamed to a plurality of viewers via a live streaming interactive platform;

receiving an input data provided in the live broadcast room by at least one viewer of the plurality of viewers while the interactive mode is activated;

computing whether the input data provided by at least one viewer of the plurality of viewers triggers the interactive mode under a probability metric, wherein the probability metric is indicative of the probability of triggering the interactive mode, wherein the probability metric is dynamically increased from an initial value to a maximum aggregated score based, at least, on accumulation of all tokens corresponding to the input data, and wherein the increase in the probability metric corresponds to an increase in the accumulated tokens corresponding to the input data;

generating a control instruction in response to triggering the interactive mode, for operating a sexual stimulation device of the model user, the control instruction comprising one or more parameters for operating the sexual stimulation device; and transmitting the control instruction to a user device associated with the model user, the sexual stimulation device communicably coupled to the user device of the model user, wherein the control instruction operates the sexual stimulation device of the model user to perform a first action based on the one or more parameters appended in the control instruction for providing sexual stimulation to the model user.

\* \* \* \* \*